US008346275B2

(12) United States Patent
Ogura

(10) Patent No.: US 8,346,275 B2
(45) Date of Patent: Jan. 1, 2013

(54) SYSTEM AND METHOD FOR CONTROLLING ACCESS POINT LOAD

(75) Inventor: Daisuke Ogura, Minato-ku (JP)

(73) Assignee: NEC Corporation, Tokyo (JP)

( * ) Notice: Subject to any disclaimer, the term of this patent is extended or adjusted under 35 U.S.C. 154(b) by 491 days.

(21) Appl. No.: 11/776,065

(22) Filed: Jul. 11, 2007

(65) Prior Publication Data

US 2008/0031212 A1   Feb. 7, 2008

(30) Foreign Application Priority Data

Aug. 4, 2006 (JP) ................................. 2006-213278

(51) Int. Cl.
*H04W 72/00* (2009.01)
(52) U.S. Cl. ...... 455/453; 455/450; 455/451; 455/452.1; 455/452.2; 370/229; 370/230; 370/235; 370/237; 370/238
(58) Field of Classification Search .......... 455/450–453; 370/229, 230, 230.1, 231, 232, 233, 234, 370/235, 236, 237, 238, 338; 709/238
See application file for complete search history.

(56) References Cited

U.S. PATENT DOCUMENTS

| | | | |
|---|---|---|---|
| 6,212,389 B1 * | 4/2001 | Fapojuwo | 455/453 |
| 6,377,548 B1 * | 4/2002 | Chuah | 370/233 |
| 6,445,679 B1 * | 9/2002 | Taniguchi et al. | 370/232 |
| 6,501,959 B1 * | 12/2002 | Seon | 455/522 |
| 6,690,939 B1 * | 2/2004 | Jonsson et al. | 455/453 |
| 6,907,243 B1 * | 6/2005 | Patel | 455/442 |
| 7,162,250 B2 * | 1/2007 | Misra | 455/453 |
| 7,400,901 B2 * | 7/2008 | Kostic et al. | 455/525 |
| 7,457,270 B2 * | 11/2008 | Tsao | 370/338 |
| 7,522,518 B1 * | 4/2009 | Satapathy | 370/229 |
| 7,940,731 B2 * | 5/2011 | Gao et al. | 370/338 |
| 8,098,637 B1 * | 1/2012 | Tewfik | 370/338 |
| 2002/0110105 A1 * | 8/2002 | Awater et al. | 370/338 |
| 2002/0173316 A1 * | 11/2002 | Jang et al. | 455/453 |
| 2004/0049570 A1 * | 3/2004 | Frank et al. | 709/223 |
| 2004/0105416 A1 * | 6/2004 | Rue | 370/338 |
| 2004/0242235 A1 * | 12/2004 | Witana | 455/452.2 |
| 2005/0053046 A1 * | 3/2005 | Wang | 370/338 |
| 2006/0040663 A1 * | 2/2006 | Ise et al. | 455/434 |

FOREIGN PATENT DOCUMENTS

| | | |
|---|---|---|
| JP | 11-55286 A | 2/1999 |
| JP | 2000-115061 A | 4/2000 |
| JP | 2003-244461 A | 8/2003 |
| JP | 2004-153529 A | 5/2004 |
| JP | 2006-60322 A | 3/2006 |
| JP | 2006-67103 A | 3/2006 |
| WO | 02065792 A2 | 8/2002 |

OTHER PUBLICATIONS

Japanese Office Action issued Nov. 22, 2011 in corresponding Japanese Patent Application No. 2006-213278.

* cited by examiner

*Primary Examiner* — Olumide T Ajibade Akonai
(74) *Attorney, Agent, or Firm* — Sughrue Mion, PLLC

(57) ABSTRACT

A plurality of access points enables communication between a higher network and a terminal, and also transmits a connection notice for notifying a connection with the terminal by establishing a wireless connection with the terminal within the coverage area. A policy control apparatus manages load state of each of the access points based on the connection notice transmitted from the access point, and instructs the over loaded access point to limit a connection with the terminal.

15 Claims, 8 Drawing Sheets

Fig. 2
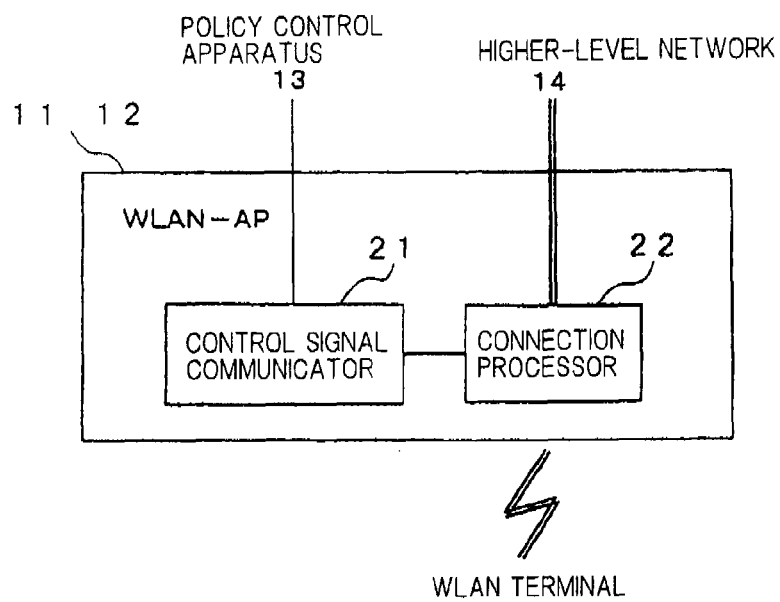
Fig. 3
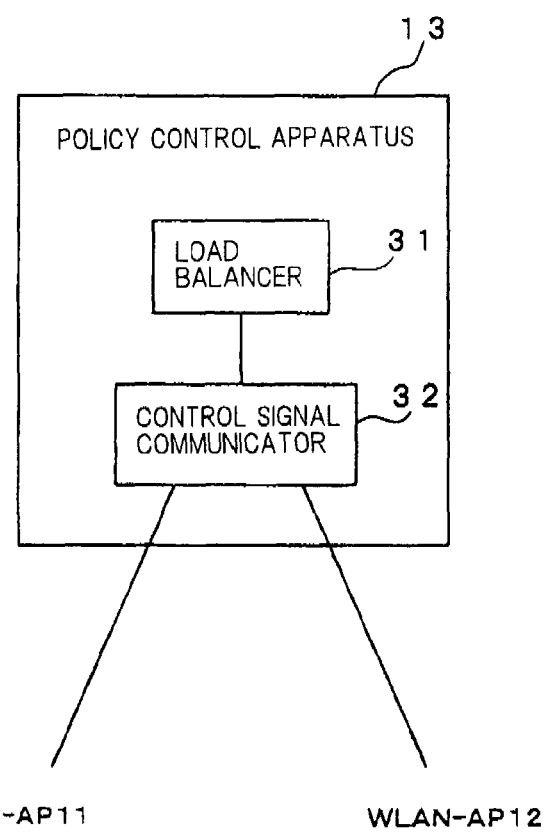
Fig. 4
| | WLAN-AP#a | WLAN-AP#b |
|---|---|---|
| NEW CONNECTION THRESHOLD | xx | xx |
| CONTINUOUS CONNECTION THRESHOLD | xx | xx |
| CURRENT CONNECTION NUMBER | xx | xx |

|  | WLAN-AP#a | WLAN-AP#b |
|---|---|---|
| NEW CONNECTION THRESHOLD | 6 | 4 |
| CONTINUOUS CONNECTION THRESHOLD | 8 | 8 |
| CURRENT CONNECTION NUMBER | 4 | 2 |

Fig. 7

| | WEIGHT | WLAN-AP#a | | WLAN-AP#b | |
|---|---|---|---|---|---|
| | | CURRENT ACCUMULATED VALUE | ACCUMULATION THRESHOLD | CURRENT ACCUMULATED VALUE | ACCUMULATION THRESHOLD |
| Voice(AC_VO) | xx | xx | xx | xx | xx |
| Video(AC_VI) | xx | xx | xx | xx | xx |
| Best Effort(AC_BE) | xx | xx | xx | xx | xx |
| Back Ground(AC_BK) | xx | xx | xx | xx | xx |
| WHOLE TOTAL | | xx | xx | xx | xx |

Fig. 9

| | WEIGHT | WLAN-AP#a | | WLAN-AP#b | |
| --- | --- | --- | --- | --- | --- |
| | | CURRENT ACCUMULATED VALUE | ACCUMULATION THRESHOLD | CURRENT ACCUMULATED VALUE | ACCUMULATION THRESHOLD |
| Voice(AC_VO) | 3 | 6 | 9 | 0 | 0 |
| Video(AC_VI) | 5 | 5 | 10 | 20 | 25 |
| Best Effort(AC_BE) | 1 | 3 | 10 | 2 | 10 |
| Back Ground(AC_BK) | 0 | 0 | 0 | 0 | 0 |
| WHOLE TOTAL | | 14 | 20 | 22 | 30 |

SYSTEM AND METHOD FOR CONTROLLING ACCESS POINT LOAD

This application is based upon and claims the benefit of priority from Japanese Patent Application No. 2006-213278 filed on Aug. 4, 2006, the content of which is incorporated by reference.

BACKGROUND OF THE INVENTION

1. Field of the Invention

The present invention relates to a wireless LAN network, specifically, to load control for an access point included in the wireless LAN network.

2. Description of the Related Art

A general WLAN (Wireless Local Area Network) network is configured so that a WLAN-AP (Access Point) connected to a higher-level network on a wire line accommodates a WLAN terminal on a wireless line to allow connection between the WLAN terminal and the higher-level network. Examples of the higher-level network are 3GPP (3rd Generation Partnership Project) network, ISP (Internet Services Provider) network, Internet, Intranet, and the like.

The WLAN network adopts the CSMA/CA (Carrier Sense Multiple Access with Collision Avoidance) method for access control in a wireless section. This CSMA/CA method controls plural WLAN terminals to share the same wireless channel in a time-division mode.

In the WLAN network of such a configuration, a band usage rate may increase and the throughput may decrease because of the increase in the number of users (the number of WLAN terminals) connected to the WLAN-AP and the concentration of traffic on a certain period. The decrease of the throughput adversely affects services in terms of the increase of delay.

In consideration of the decrease of throughput, a bottleneck for a throughput is likely to exist in a wireless section. This is because the wired section between a WLAN-AP and a higher-level network is generally provided with a relatively large transmission capacity, while a wireless section between a WLAN-AP and a WLAN terminal is provided with only a limited band. This is attributed to the nature of wireless communication such that limited resource provided to a WLAN network should be effectively utilized because of limited radio frequency.

One of the causes for a decrease in throughput is the reduction of resources in a wireless channel because many WLAN terminals are connected under a single WLAN-AP. In the CSMA/CA method, plural WLAN terminals can not access a target wireless channel at the same time. If many WLAN terminals use a wireless channel in a time-division mode, the time allowed for one of the WLAN terminals to have an access may be shortened. This also causes the throughput to decrease.

Even when a smaller number of WLAN terminals are connected to a WLAN-AP, the throughput may decrease because some WLAN terminals among them utilize a rich service. A rich service is a service which needs real-timeness and a band above a certain level, such as VoIP and Video. A real-time rich service such as a streaming service of VoIP and Video needs to secure high-rate and stable throughput to provide a service which is stable in quality. Thus, a rich service greatly influences the throughput of a WLAN network.

In recent years, because the market related to the WLAN has expanded, the area in which WLAN service is provided has also expanded, and the number of WLAN terminals utilizing the WLAN service has increased. As the number of WLAN terminals increases, there is a concern that the WLAN network may be overloaded, which may reduce throughput and degrade service quality and the performance of the network connection.

The WLAN network is required to provide various sizes of service areas according to the locations in which the WLAN network is applied. To address this, the required size of service area is formed by positioning the required number of WLAN-APs close to each other. Generally, because a WLAN terminal can move, it may move from a coverage area of one WLAN-AP to a coverage area of another WLAN-AP. At that time, the WLAN terminal is handed over or reconnected to the other WLAN-AP to continue communication.

In the WLAN network in which plural WLAN-APs are thus located close to each other, it can be expected that the overload state will be alleviated and that good overall service quality will be maintained by distributing and balancing the loads on each WLAN-AP.

Thus, a technique is proposed in which a management apparatus is disposed for collectively managing the congested state of plural WLAN-APs, which in turn control WLAN terminals by taking into account the congestion. Japanese Patent Laid-Open No. 2006-067103 (hereinafter, referred to as Document 1) discloses such a technique in which a management server manages the number of WLAN terminals connected to each of plural WLAN-APs, and instructs a newly connected WLAN terminal to connect to the best WLAN-AP.

According to the technique disclosed in the above Document 1, regardless of whether or not the WLAN network is in a state where the congestion should be alleviated, the management server determines the best WLAN-AP based on the state of each WLAN-AP, etc. and notifies it to a WLAN terminal whenever the WLAN terminal is newly connected. Thus, there is such a problem that, as the number of WLAN-APs under the management server and/or the number of WLAN terminals which try to connect to WLAN-APs increase, the amount of processing in the management server that is needed to make a determination and carry out notification also increases.

SUMMARY OF THE INVENTION

It is an exemplary object of the present invention to provide a WLAN network system which can appropriately control the load of plural WLAN-APs with a small amount of processing.

To achieve the above object, an exemplary aspect of the present invention is a wireless LAN network system which enables communication between a terminal and a higher-level network by connecting to a wireless terminal, and includes:

plural access points which are previously connected to the higher-level network, form a coverage area by wireless, enable communication between the higher-level network and the terminal if it is connected by wireless to the terminal in the coverage area, and transmit a connection notice for notifying a connection with the terminal; and a policy control apparatus which is connected to the plural access points, manages the load state of each of the access points based on the connection notice transmitted from the access point, and instructs the overloaded access points to limit connection with a terminal.

The above and other objects, features, and advantages of the present invention will become apparent from the following description with references to the accompanying drawings which illustrate examples of the present invention.

BRIEF DESCRIPTION OF THE DRAWINGS

FIG. 2 is a block diagram illustrating WLAN-APs 11 and 12 according to the first exemplary embodiment;

FIG. 3 is a block diagram illustrating policy control apparatus 13 according to the first exemplary embodiment;

FIG. 4 is a diagram illustrating an example of a load state management table which load balancer 31 uses for determination according to the first exemplary embodiment;

FIG. 7 is a diagram illustrating an example of the load state management table which load balancer 31 uses for determination according to the second exemplary embodiment of the present invention;

FIG. 9 is a diagram illustrating an initial state of the load state management table of the operation example of FIG. 8;

DETAILED DESCRIPTION OF THE PREFERRED EMBODIMENTS

Figure 1:
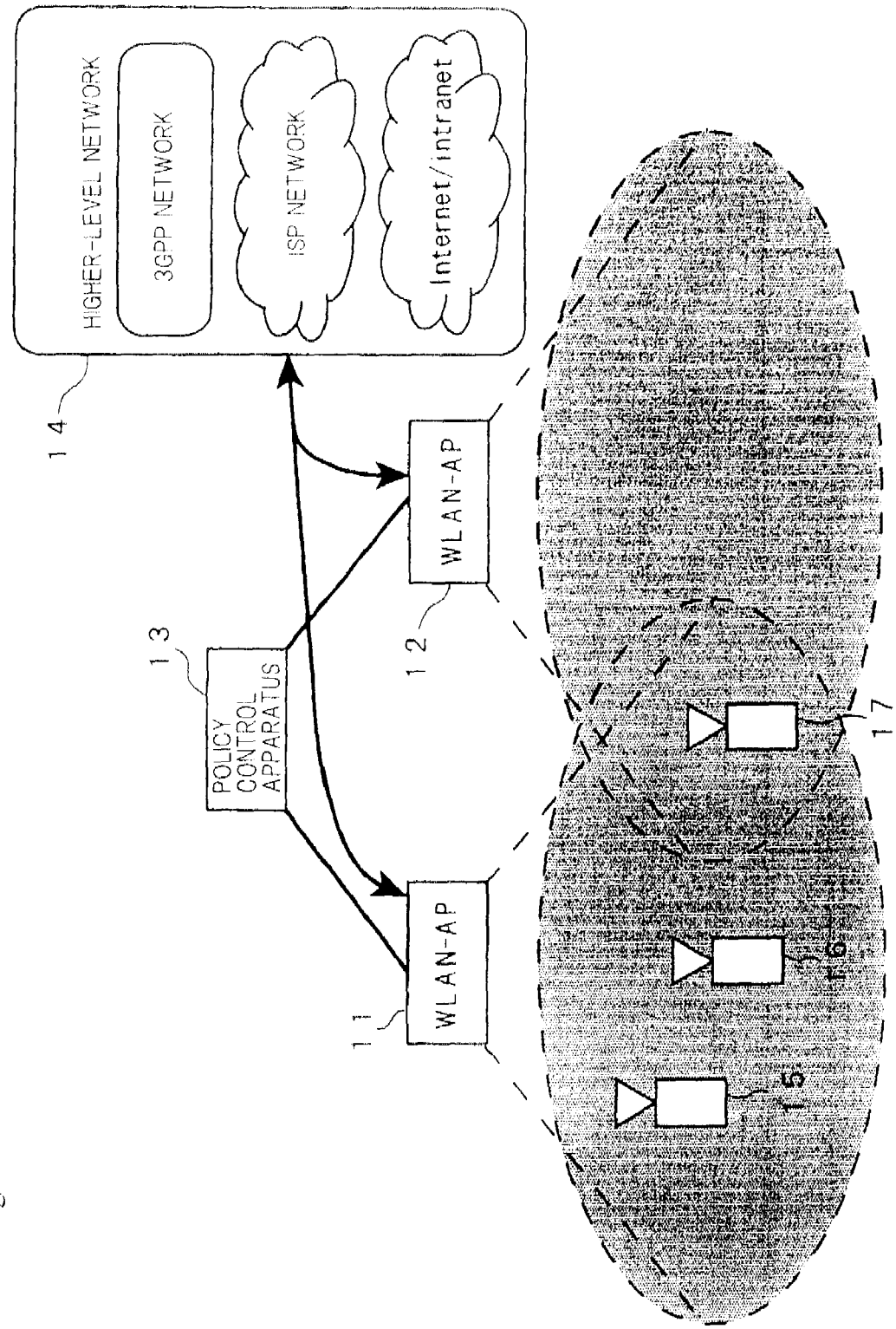
FIG. 1 is a block diagram illustrating a WLAN network system according to the first exemplary embodiment of the present invention.

Exemplary embodiments of the present invention will be described in details referring to the drawings.

The First Exemplary Embodiment

FIG. 1 is a block diagram illustrating a WLAN network system of the first exemplary embodiment. Referring to FIG. 1, the WLAN network system of the first exemplary embodiment includes plural WLAN-APs 11 and 12 and policy control apparatus 13. WLAN-APs 11 and 12 are connected to, and located under policy control apparatus 13. WLAN-AP 11, 12 are connected to higher-level network 14. Higher-level network 14 is, for example, 3GPP network, ISP network, Internet, Intranet, etc.

WLAN-APs 11 and 12 form a coverage area with wireless electric waves, and can include a WLAN terminal within the coverage area by using a wireless circuit. The coverage area of WLAN-AP 11 and the coverage area of WLAN-AP 12 overlap in the first exemplary embodiment. In one example of the first exemplary embodiment, there are three WLAN terminals 15 to 17. WLAN terminals 15 and 16 exist only in the coverage area of WLAN-AP 11, and WLAN terminal 17 exists where the coverage area of WLAN-AP 11 and the coverage area of WLAN-AP 12 overlap.

In such a configuration, WLAN-APs 11 and 12 transmit and receive a control signal to and from policy control apparatus 13. Specifically, WLAN-APs 11 and 12 transmit a traffic report to policy control apparatus 13, and receive a control instruction from policy control apparatus 13.

The traffic report is a control signal for notifying the traffic state of each WLAN-AP. Policy control apparatus 13 controls the load balances of WLAN-APs 11 and 12 based on this traffic report. The control instruction is a control signal from policy control apparatus 13 for controlling the load balance of WLAN-APs 11 and 12, specifically, is a signal for instructing WLAN-APs 11 and 12 to permit, or not to permit connection request from a WLAN terminal.

In the first exemplary embodiment, the connection request includes a new connection request and a continuous connection request. The new connection request is a request that a WLAN terminal issues when trying to newly connect to a WLAN-AP. The continuous connection request is a request that a WLAN terminal issues when trying to connect to a WLAN-AP in the case of a hand over operation or a reconnection operation.

If WLAN-APs 11 and 12 receive a connection request from a WLAN terminal, it determines whether or not to permit the connection request. Whether or not the connection request is permitted is determined based on a control instruction from policy control apparatus 13.

If policy control apparatus 13 instructs that a connection request be permitted, WLAN-APs 11 and 12 permit the connection request to connect to a WLAN terminal. If WLAN-APs 11 and 12 permit the connection request to connect with the WLAN terminal, they relay-transfer user data between the WLAN terminal and higher-level network 14. Meanwhile, the user data transmitted or received between the WLAN terminal and higher-level network 14 is directly transferred between WLAN-APs 11 and 12 and higher-level network 14, without passing through policy control apparatus 13.

On the other hand, if policy control apparatus 13 instruct that a connection request be not permitted, WLAN-APs 11 and 12 reject the connection request.

If policy control apparatus 13 receives a traffic report from WLAN-APs 11 and 12, it checks the load state of WLAN-APs 11 and 12. Then policy control apparatus 13 determines from the load state whether to cause WLAN-APs 11 and 12 to be in such a state that a connection request is permitted, or in such a state that a connection request is not permitted.

Then, if it is determined that the WLAN-AP is caused to be in such a state that a connection request is not permitted, policy control apparatus 13 transmits a control signal for instructing the rejection of a connection request to the WLAN-AP. If it is determined to cause the WLAN-AP which has been in such a state in which a connection request is not permitted to be in such a state that a connection request is permitted, policy control apparatus 13 transmits a control signal for instructing permission for a connection request to the WLAN-AP.

WLAN-APs 11 and 12 which have received the control signal instructing rejection of a connection request, move to such a state in which a connection request is not permitted, and reject the following connection request from a WLAN terminal. WLAN-APs 11 and 12 which have received the control signal giving permission for a connection request, move to such a state in which a connection request is permitted, and permit the following connection request from a WLAN terminal.

FIG. 2 is a block diagram illustrating WLAN-APs 11 and 12 according to the first exemplary embodiment. Referring to FIG. 2, WLAN-APs 11 and 12 include control signal communicator 21 and connection processor 22.

If connection processor 22 receives a connection request, it transmits a traffic report to policy control apparatus 13 through control signal communicator 21, and also determines whether or not to permit the connection request.

Connection processor 22 determines whether or not to permit the connection request according to management information determined by an instruction from policy control apparatus 13. If it is determined to permit the connection request, connection processor 22 establishes a connection with a WLAN terminal. If it is determined not to permit the connection request, connection processor 22 does not establish a connection with a WLAN terminal.

If a control instruction is received from policy control apparatus 13 through control signal communicator 21, connection processor 22 updates the management information according to the control instruction. It is included in the management information whether or not to permit a connection request. As described above, in the first exemplary embodiment, the connection request includes a new connection request and a continuous connection request. Thus, in the management information, it is assumed that whether or not such information that a connection request is permitted is set for each of the new connection request and the continuous connection request.

Control signal communicator 21 communicates with policy control apparatus 13 using control signal.

FIG. 3 is a block diagram illustrating policy control apparatus 13 according to the first exemplary embodiment. Referring to FIG. 3, policy control apparatus 13 includes load balancer 31 and control signal communicator 32.

If load balancer 31 receives a traffic report from a WLAN-AP through control signal communicator 32, it determines whether to cause the WLAN-AP to be in such a state that a connection request is permitted, or in such a state that a connection request is not permitted, and transmits a control instruction to the WLAN-AP through control signal communicator 32 according to the determination result. At that time, load balancer 31 uses a load state management table in order to determine whether to cause the WLAN-AP to be in such a state that a connection request is permitted, or in such a state in which a connection request is not permitted.

FIG. 4 is a diagram illustrating an example of the load state management table which load balancer 31 of the first exemplary embodiment uses to determine. Referring to FIG. 4, a new connection threshold, a continuous connection threshold, and a current connection number for each WLAN-AP are recorded in the load state management table. In the example of FIG. 4, two WLAN-APs of WLAN-AP #a and WLAN-AP #b are assigned.

The current connection number indicates the number of WLAN terminals which are currently connected to the WLAN-AP. The new connection threshold is a threshold of the number of terminals to be connected for determining whether or not a new connection request is permitted. The continuous connection threshold is a threshold of the number of terminals connected to be connected for determining whether or not a continuous connection request is permitted.

If the current connection number has not reached the new connection threshold, a new connection request is permitted. On the other hand, if the current connection number has reached the new connection threshold, a new connection request is not permitted. And if the current connection number has not reached the continuous connection threshold, a continuous connection request is permitted. On the other hand, if the current connection number has reached the continuous connection threshold, a continuous connection request is not permitted.

For example, if a new connection or release of a connection of a WLAN terminal to WLAN-APs 11 and 12 is performed, load balancer 31 updates the current connection number, compares the updated current connection number with the new connection threshold and the continuous connection threshold, and transmits a control instruction based on the comparison result to the WLAN-AP.

Meanwhile, it is preferable to cause each value of the new connection threshold and the continuous connection threshold to satisfy such a relationship in which the new connection threshold is less than or equal to the continuous connection threshold. Based on such a policy in which the continuity of an existing call is considered more important than the connectivity of a new call, it is possible to reduce the probability that a call will be disconnected while communicating by preventing the connection of a new call and keeping some room in the band for the continuity of the existing call. The amount of difference between the new connection threshold and the continuous connection threshold may be adjusted according to the operation state.

And it is preferable to cause the continuous connection threshold to be smaller than the maximum number to be permitted of a WLAN terminal connected to a WLAN-AP. If plural WLAN terminals transmit connection requests at the same time, a WLAN-AP keeps some room in the band and accommodates the transient increase of traffic so as to permit such connections. The amount of room may be adjusted according to the operation state.

Control signal communicator 32 communicates with WLAN-APs 11 and 12 using the control signal.

Figures 5, 6:
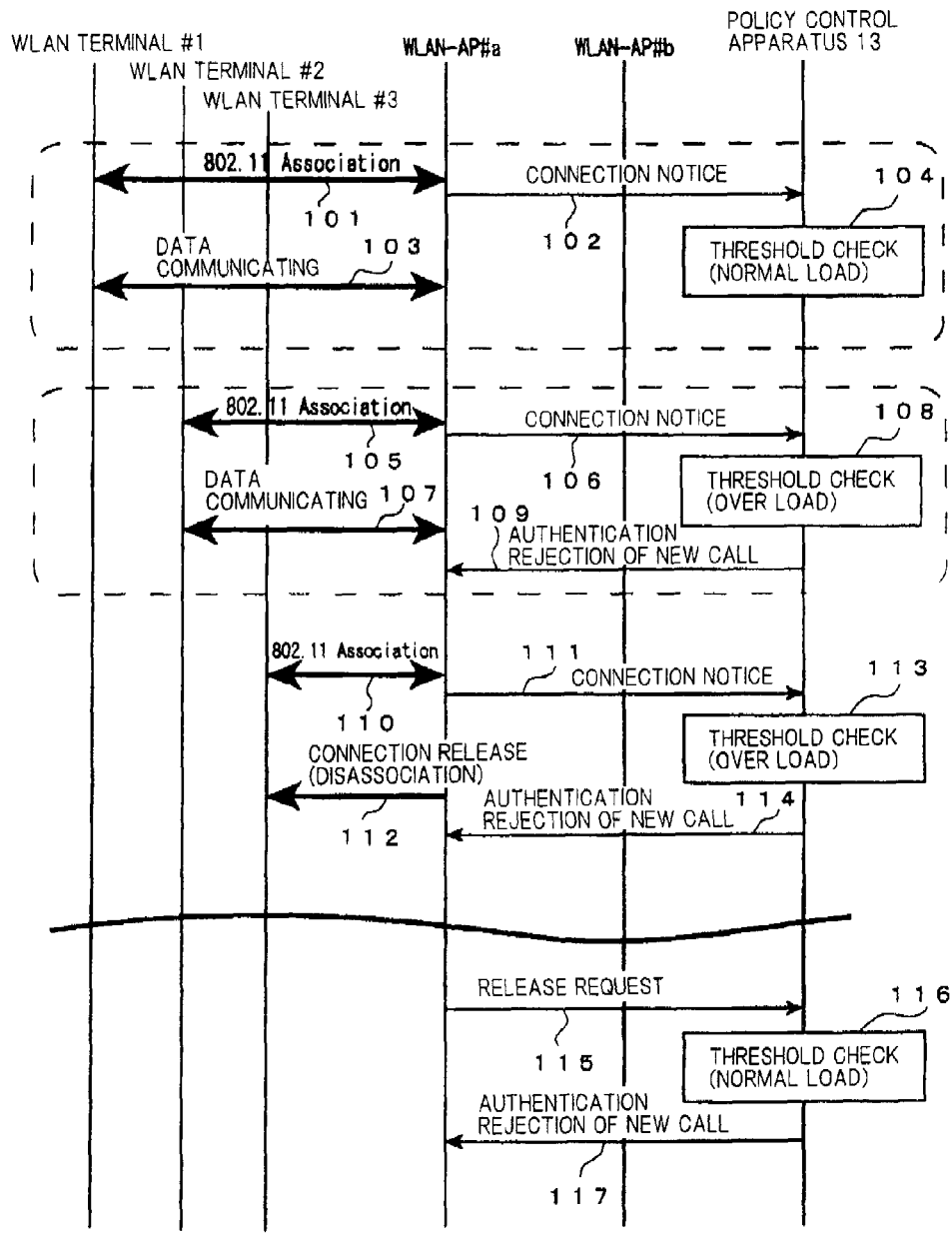
FIG. 5 is a sequence diagram illustrating an operation example of the WLAN network system according to the first exemplary embodiment.
FIG. 6 is a diagram illustrating an initial state of the load state management table of the operation example of FIG. 5.

FIG. 5 is a sequence diagram illustrating an operation example of the WLAN network system according to the first exemplary embodiment. Here, WLAN-AP #a and WLAN-AP #b are connected under policy control apparatus 13. It is assumed that WLAN-AP terminals #1 to #3 sequentially transmit connection requests to WLAN-AP #a.

FIG. 6 is a diagram illustrating an initial state of the load state management table of the operation example of FIG. 5. In the example of FIG. 6, the current connection number of WLAN-AP #a is "4", and the current connection number of WLAN-AP #b is "2". The new connection number of WLAN-AP #a is "6", and the new connection number of WLAN-AP #b is "4". The continuous connection number of WLAN-AP #a is "8", and the continuous connection number of WLAN-AP #b is "8".

From this initial state, WLAN terminal #1 transmits a connection request to WLAN-AP #a. It is assumed that this connection request is a new connection request. Meanwhile, as described above, while a connection request includes a new connection request (new call) and a continuous connection request (existing call), a message containing a new connection request is different from that of a continuous connection request, so that a WLAN-AP can identify them with the request messages.

A "802.11 Association" procedure is executed between WLAN terminal #1 and WLAN-AP #a when a new connection request is issued (step 101). The "802.11 Association" procedure is a procedure of a new connection defined by IEEE 802.11.

At this point in time, because the current connection number of WLAN-AP #a is "4", and does not reach the new connection threshold "6", WLAN-AP #a is in such a state that a new connection request is permitted. WLAN-AP #a permits a new connection request, and transmits a connection notice message as a traffic report to policy control apparatus 13 (step 102). This connection notice message notifies policy control apparatus 13 of the fact that WLAN terminal #1 has been connected with WLAN-AP #a, and includes information indicating that it is a connection of a new call. Because the new connection request has been permitted, WLAN terminal #1 reaches such state in which it can communicate data with WLAN-AP #a (step 103).

Policy control apparatus 13 which has received the connection notice message adds 1 to the current connection number and causes it to be "5" in the load state management table, and compares the current connection number "5" with the new connection threshold "6" (step 104). Here, because the current connection number is smaller than the new connection threshold, policy control apparatus 13 does not transmit a control instruction message to WLAN-AP #a.

Subsequently, WLAN terminal #2 transmits a connection request to WLAN-AP #a. It is assumed that this connection request is also a new connection request. The "802.11 Association" procedure is executed between WLAN terminal #2 and WLAN-AP #a when the new connection request is issued (step 105).

At this point in time, WLAN-AP #a has been in a state that a new connection request is permitted. WLAN-AP #a permits the new connection request, and transmits a connection notice message, as a traffic report, to policy control apparatus 13 (step 106). This connection notice message notifies policy control apparatus 13 of the fact that WLAN terminal #2 has been connected with WLAN-AP #a, and includes information indicating that it is a connection of a new call. Because the new connection request has been permitted, WLAN terminal #2 reaches to such state that it can communicate data with WLAN-AP #a (step 107).

Policy control apparatus 13 which has received the connection notice message adds 1 to the current connection number and causes it to be "6" in the load state management table, and compares the current connection number "6" with the new connection threshold "6" (step 108). Here, because the current connection number is equal to the new connection threshold, policy control apparatus 13 transmits such a control instruction message to WLAN-AP #a so that it is caused to be in a state in which a new connection request is not permitted (step 109). A new connection request is rejected by, for instance, rejecting an authentication request. WLAN-AP #a which has received the control instruction message reaches to such state that a new connection request is not permitted.

Subsequently, WLAN terminal #3 transmits a connection request to WLAN-AP #a. It is assumed that this connection request is also a new connection request. The "802.11 Association" procedure is executed between WLAN terminal #3 and WLAN-AP #a when a new connection request is issued (step 110).

At this point in time, WLAN-AP #a is in such a state that a new connection request is not permitted. WLAN-AP #a transmits such a connection notice message to policy control apparatus 13 so that a new call required from WLAN terminal #3 is not connected (step 111).

WLAN-AP #a instructs a connection release for WLAN terminal #3 unsig "802.11 DisAssociation" procedure (step 112). The "802.11 DisAssociation" procedure is a procedure of the connection release defined by IEEE 802.11. Because a new connection request is rejected, WLAN terminal #3 does not reach such state that it can communicate data with WLAN-AP #a.

Policy control apparatus 13 which has received the connection notice causes the current connection number remain to be "6" in the load state management table, and compares the current connection number "6" with the new connection threshold "6" (step 113). Here, because the current connection number is equal to the new connection threshold, policy control apparatus 13 transmits such a control instruction message to WLAN-AP #a so that it is caused to be in such a state that a new connection request is not permitted (step 114).

In this example, when receiving a connection release notice from a WLAN terminal, WLAN-AP #a releases a connection with the WLAN terminal. When connecting with a WLAN terminal, WLAN-AP #a starts a timer which finishes by passing a certain time, and when the timer finishes, a connection with the WLAN terminal may be released.

When releasing a connection with a WLAN terminal, WLAN-AP #a transmits such a release request message to policy control apparatus 13 that a connection with the WLAN terminal is released (step 115). Policy control apparatus 13 which has received the release request message from WLAN-AP #a subtracts 1 from current connection number of WLAN-AP #a to cause it to be "5", and compares current connection number "5" with new connection threshold "6" and continuous connection threshold "8" (step 116). Here, because the current connection number "5" has become smaller than the new connection threshold "6", policy control apparatus 13 transmits such a control instruction message to WLAN-AP #a so that it is caused to be in such a state that a new connection request is permitted (step 117).

Meanwhile, in the example of FIG. 5, WLAN-AP #a transmits such a connection notice message to policy control apparatus 13 at steps 102 and 106 so that a new call is connected, and transmits such a connection notice message to policy control apparatus 13 at step 111 so that a new call is not connected, however, the present invention is not limited to this procedure. As another example, a connection notice message transmitted from WLAN-AP #a to policy control apparatus 13 may be such a notice that a new connection request has been issued, and WLAN-AP #a may transmit the same connection notice message to policy control apparatus 13 at steps 102, 106, and 111. In this case, policy control apparatus 13 may determine by itself whether or not a new connection request is permitted based on whether or not WLAN-AP #a is in such a state that a new connection request will be permitted, and determine whether or not to count up the current connection number.

As another example, WLAN-AP #a may transmit a connection notice message only when the connection request is permitted, and may not transmit a connection notice message when a connection request is not permitted. That is, in the example of FIG. 5, WLAN-AP #a transmits a connection notice message at steps 102 and 106, and does not transmit a connection notice message at step 111.

As another example, whenever executing "Association" procedure, WLAN-AP #a may transmit a connection notice message notifying policy control apparatus 13 of a connection with a WLAN terminal, and whenever executing "DisAssociation" procedure, WLAN-AP #a may transmit a release notice message notifying policy control apparatus 13 that a connection with a WLAN terminal has been released. In such a case, policy control apparatus 13 may count up the current connection number if the connection notice message is received, and count down the current connection number if the release notice message is received.

In the example of FIG. 5, if a WLAN-AP which is in such a state that a connection request is not permitted receives a connection request from a WLAN terminal, it rejects the connection by rejecting an authentication request, however, the present invention is not limited to this example. As another example, if a WLAN-AP which is in such a state in which a connection request is not permitted receives a connection request from a WLAN terminal, it may instruct the WLAN terminal to connect to another WLAN-AP.

Although it is shown in the example of FIG. 5 that WLAN terminals #1,2,3a transmit new connection requests to WLAN-AP #a, even if these are continuous connection requests, the WLAN network system executes the same operation. If policy control apparatus 13 receives a connection notice message from WLAN-AP #a that there is a continuous connection, it compares the continuous connection threshold with the current connection number obtained by adding 1 to the current connection number.

As described above, according to the first exemplary embodiment, if each of WLAN-APs 11 and 12 connect to a WLAN terminal, each of WLAN-APs 11 and 12 transmit such a traffic report to policy control apparatus 13 indicating that they each have connected to a WLAN terminal. Policy control apparatus 13 manages the load state of each of WLAN-APs 11 and 12 based on the traffic report, and if some WLAN-AP reaches in an overload state, instructs the WLAN-AP to move to such a state in which a connection request is not permitted. Because policy control apparatus 13 transmits an instruction to a WLAN-AP only when limitation is necessary as a result of simple processing of a comparison between the load state and the threshold, it is possible to appropriately control the load of plural WLAN-APs with a small amount of processing.

According to the first exemplary embodiment, because policy control apparatus 13 has previously changed the state of WLAN-APs 11 and 12 which have reached in an overload state, when a connection request is initiated after they have reached an overload state, WLAN-APs 11 and 12 can quickly determine whether to reject the connection request.

According to the first exemplary embodiment, because different thresholds are set to each of a new connection request and to a continuous connection request to control the load, it is possible to provide priority to a new call and to an existing call in order to control the load. For example, it is possible to reduce the probability that a call is disconnected while communicating by preventing connection of a new call and keeping some room in the band for the continuation of an existing call based on such a policy in which the continuity of an existing call is considered more important than the connecting of a new call by causing the new connection threshold to be less than or equal to the continuous connection threshold.

Meanwhile, in the first exemplary embodiment, the load state is not determined by using the amount of real-time data in the actual communication because it is not possible to understand such a service by a transient value in which the burstness is high and the change of the amount of data is large, such as "Best Effort" or "Back Ground".

The Second Exemplary Embodiment

While in the first exemplary embodiment, the load state of the WLAN-AP is determined based on the number of WLAN terminals connected to a WLAN-AP, in the second exemplary embodiment, the load state is determined based on an accumulated value weighted for each QoS. Generally, a band used for one call is different for each QoS. It is possible to determine the load state more appropriately by using a weighted accumulated value.

In the second exemplary embodiment, a threshold for an accumulated value of each QoS and a threshold for a total of accumulated values of all QoSs are set, and whether or not to permit a connection request for each QoS is determined by using such thresholds. A band used for one call is different for each QoS class, and also the characteristics, priority, and influence for another call are different for each QoS. It is possible to control the load more appropriately by determining for each QoS class whether or not to permit a connection request.

A configuration of the WLAN network system of the second exemplary embodiment is the same as that of the first exemplary embodiment illustrated in FIG. 1. A configuration of WLAN-APs 11 and 12 of the second exemplary embodiment is the same as that of the first exemplary embodiment illustrated in FIG. 2. A configuration of policy control apparatus 13 of the second exemplary embodiment is the same as that of the first exemplary embodiment illustrated in FIG. 3.

As the second exemplary embodiment is different from the first exemplary embodiment, load balancer 31 of policy control apparatus 13 manages the load state of each of WLAN-APs 11 and 12 for each QoS class, and transmits a control instruction of each QoS to WLAN-APs 11 and 12. Connection processor 22 of WLAN-APs 11 and 12 determines whether or not to permit a connection request for each QoS according to the management information of each QoS class determined by the control instruction from policy control apparatus 13.

FIG. 7 is a diagram illustrating an example of the load state management table which load balancer 31 uses for making a determination. Referring to FIG. 7, a current accumulated value and an accumulation threshold of each QoS class ("Voice", "Video", "Best Effort", "Back Ground") are recorded for each WLAN-AP in the load state management table. A weight for calculating the current accumulated value of each QoS class is previously determined.

The weight is a value of the weighting that is set by estimating the amount of usage of a wireless band for each QoS class, and is set by a network administrator. By accumulating values weighted for each call (WLAN terminal), it is possible to recognize that the amount of band usage of each WLAN-AP and the amount of band usage of each QoS class are close to the actual value.

The current accumulated value is a value accumulated for weights of connected calls (WLAN terminal) in each QoS class, and is the amount of current band usage in a wireless section. This current accumulated value becomes close to the actual value of the amount of current band usage of each WLAN-AP and each QoS class by usage of weight for each QoS class. WLAN-APs 11 and 12 of the second exemplary embodiment transmit a connection notice notifying a connection with a WLAN terminal and including QoS information to policy control apparatus 13. The QoS information is information indicating a QoS class of a connected call. Policy control apparatus 13 can manage with this QoS information the load state of each of WLAN-APs 11 and 12 for each QoS class.

In FIG. 7, both an accumulated value of each QoS class and an accumulated value of the whole WLAN-AP are recorded in the load state management table. Policy control apparatus 13 may operate by using both of the accumulated values, or may operate by using any one of the accumulated values. The WLAN network administrator may arbitrary select the method used.

The accumulation threshold is a maximum value of the amount of band usage permitted for each QoS class, and a maximum value indicating the amount of band usage permitted for the whole WLAN-AP, and the threshold corresponds to the current accumulated value.

Policy control apparatus 13 operates as follows by using this load state management table. While the current accumulated value is less than the accumulation threshold, policy control apparatus 13 updates the current accumulated value and manages the load state of each WLAN-AP and each QoS class when a connection notice is received.

If the current accumulated value of any QoS class of some WLAN-AP reaches the accumulation threshold, policy control apparatus 13 limits the corresponding QoS class of the WLAN-AP. The limitation on a QoS class is realized by placing a call of the QoS class in a state where connection is not permitted.

If the current accumulated value of the whole total of some WLAN-AP reaches the accumulation threshold, policy control apparatus 13 limits the whole WLAN-AP. The limitation on a WLAN-AP is realized by placing a call of the WLAN-AP in a state where connection is not permitted.

Meanwhile, the limitation on a QoS class or the limitation on a WLAN-AP may be realized by suggesting a connection to a nearby WLAN-AP which can provide services of the QoS class required by a WLAN terminal.

Figure 8:
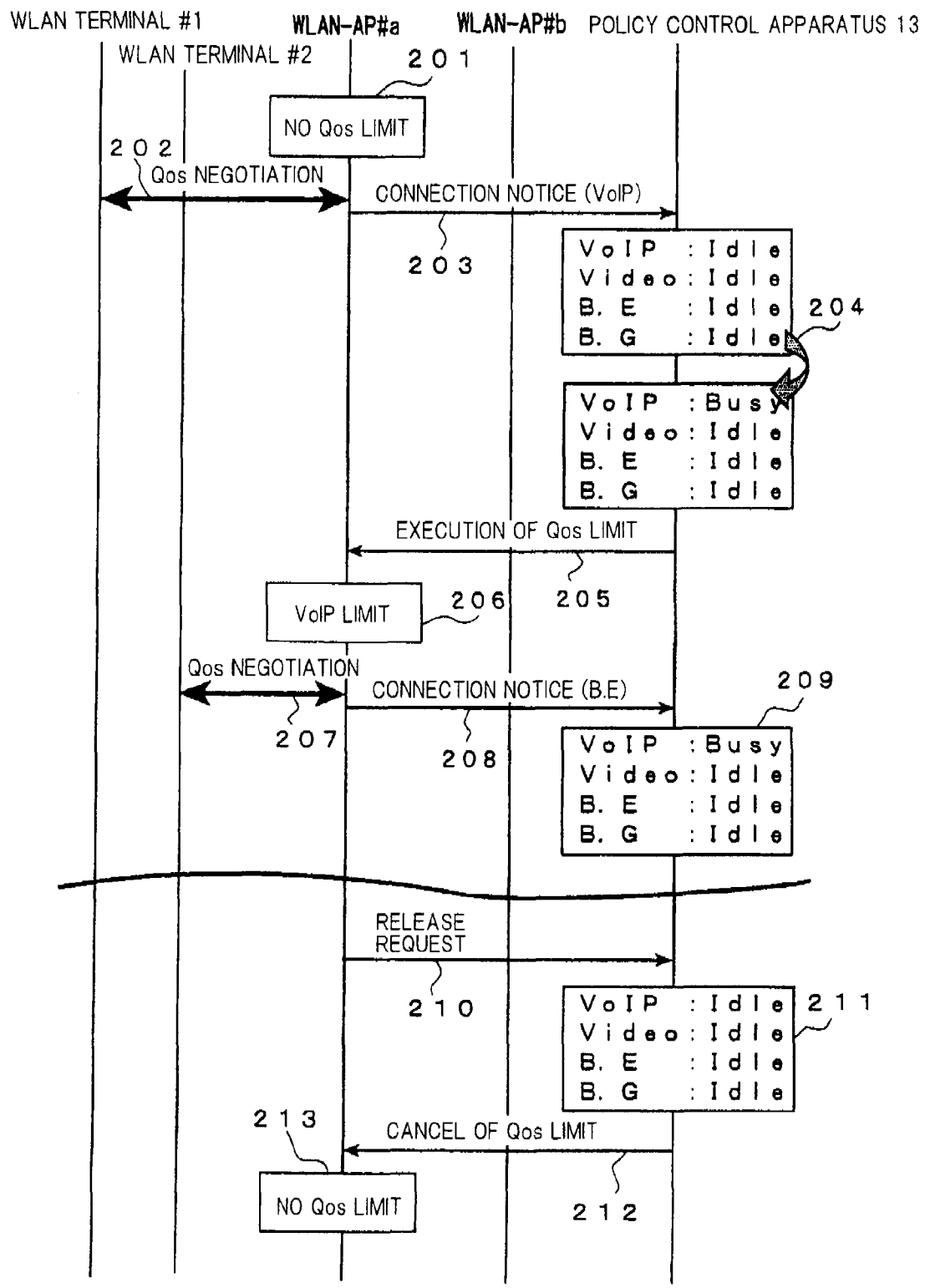
FIG. 8 is a sequence diagram illustrating an operation example of the WLAN network system according to the second exemplary embodiment.

FIG. 8 is a sequence diagram illustrating an operation example of the WLAN network system according to the second exemplary embodiment. Here, WLAN-AP #a and WLAN-AP #b are connected under policy control apparatus 13. It is assumed that WLAN terminals #1 and #2 sequentially transmit connection requests to WLAN-AP #a.

FIG. 9 is a diagram illustrating an initial state of the load state management table of the operation example of FIG. 8. In an example of FIG. 9, a weight of "Voice" is "3", a weight of "Video" is "5", a weight of "Best Effort" is "1", and a weight of "Back Ground" is "0". When the weight is "0", this means that a load for the corresponding QoS class is not to be accumulated.

In an initial state, any QoS class is not limited for WLAN-AP #a (step 201). In this initial state, WLAN terminal #1 transmits a connection request of VoIP (Voice over IP) to WLAN-AP #a.

The "QoS negotiation" is executed between WLAN terminal #1 and WLAN-AP #a when the connection request is issued (step 202). WLAN terminal #1 requests VoIP service in this QoS negotiation.

At this point in time, because WLAN-AP #a is in a state to permit VoIP, it permits a connection request of VoIP, and transmits a connection notice message for notifying policy control apparatus 13 that VoIP has been connected, (step 203).

Policy control apparatus 13 which has received the connection notice message adds weighted value "3" to the current accumulated value of VoIP "6" to cause it to be "9", and compares the current accumulated value "9" with the accumulation threshold "9" (step 204). Here, because the current accumulated value is equal to the accumulation threshold, policy control apparatus 13 determines that VoIP of WLAN-AP #a has reached in an over load state (Busy), and transmits such a control instruction message to WLAN-AP #a such that it is caused to be in a state not to permit a connection request of VoIP (step 205). WLAN-AP #a which has received the control instruction message moves to a state not to permit a connection of VoIP (step 206).

Subsequently, WLAN terminal #2 transmits a connection request of VoIP to WLAN-AP #a. "QoS negotiation" is executed between WLAN terminal #2 and WLAN-AP #a when the connection request is issued (step 207).

At this point in time, WLAN-AP #a is in a state not to permit a connection request of VoIP. Thus, WLAN-AP #a assigns Best Effort to WLAN terminal #2, and transmits a connection notice message for notifying policy control apparatus 13 that a call of Best Effort has been connected (step 208).

Policy control apparatus 13 which has received the connection notice message adds weighted value "1" to the current accumulated value of Best Effort "3" to cause it to be "4", and compares the current accumulated value "4" with the accumulation threshold "10" (step 209). Here, because the current accumulated value is less than the accumulation threshold, policy control apparatus 13 does not transmit a control instruction message to WLAN-AP #a.

In this example, when receiving a connection release notice from a WLAN terminal, WLAN-AP #a releases a connection with the WLAN terminal. When connecting with a WLAN terminal, WLAN-AP #a may start a timer which finishes by passing a certain time, and release a connection with the WLAN terminal when the timer finishes.

When releasing a connection with WLAN terminal #1, WLAN-AP #a transmits such a release request message that it releases a connection with WLAN terminal #1 to policy control apparatus 13 (step 210). Policy control apparatus 13 which has received the release request message subtracts weighted value of VoIP "3" from the current accumulated value of WLAN-AP #a "9", and compares the current accumulated value "6" with the accumulation threshold "9" (step 211). Here, because the current accumulated value "6" has become less than the accumulation threshold "9", policy control apparatus 13 transmits such a control instruction message to WLAN-AP #a that permits a connection of VoIP (step 212).

WLAN-AP #a which has received the control instruction message releases limitation for VoIP, and changes to a state to permit a connection of a call (step 213).

As described above, according to the second exemplary embodiment, if each of WLAN-APs 11 and 12 connects with a WLAN terminal, the WLAN terminal transmits a traffic report to policy control apparatus 13 indicating that a call connection has been performed and indicating QoS class of the call. Policy control apparatus 13 manages the load state with an accumulated value weighted for each QoS class based on the traffic report, and controls the load for each WLAN-AP and each QoS. It is possible to understand the load state of each QoS class appropriately and to favorably control load of each QoS class by using the weighted accumulated value.

The Third Exemplary Embodiment

In the third exemplary embodiment, a WLAN-AP which has detected an over load state is caused to be in a state to reject a connection request as in the first exemplary embodiment. In the third exemplary embodiment, in addition, when rejecting a connection of a WLAN terminal, the WLAN-AP which is in an over load state directs the WLAN terminal to another WLAN-AP. It is possible to prevent the service quality of an existing call from being lowed by placing the WLAN-AP, which is in an over load state, in a state to reject a connection request, and also to improve the connectivity of a new call and the service quality by directing the WLAN terminal to another WLAN-AP.

A configuration of the WLAN network system of the third exemplary embodiment is the same as that of the first exemplary embodiment illustrated in FIG. 1. A configuration of policy control apparatus 13 of the third exemplary embodiment is the same as that of the first exemplary embodiment illustrated in FIG. 3.

Figure 10:
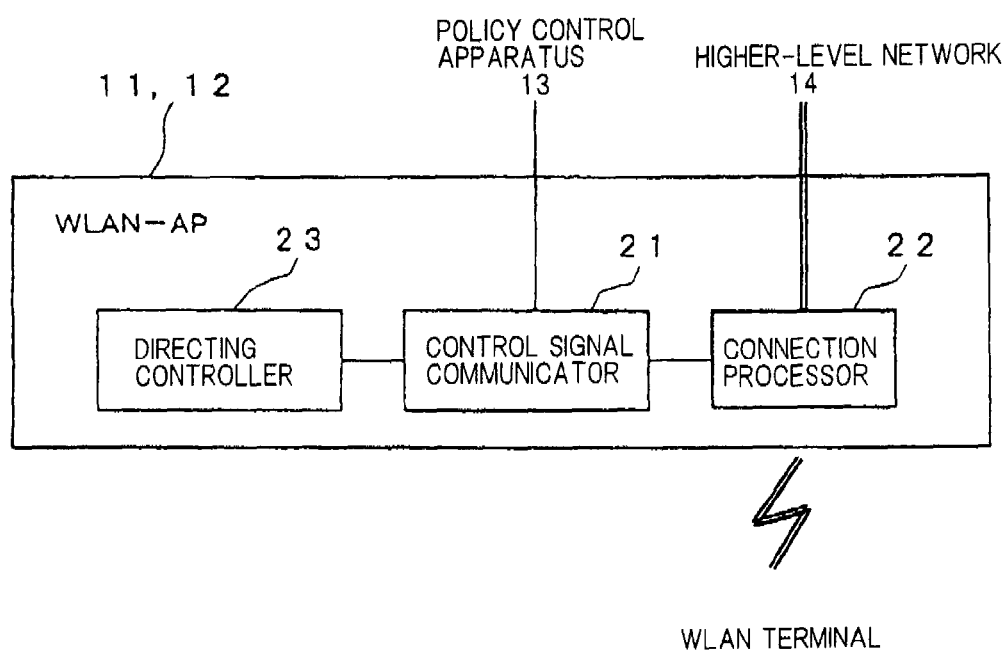
FIG. 10 is a block diagram illustrating WLAN-APs 11 and 12 according to the third exemplary embodiment of the present invention.

FIG. 10 is a block diagram illustrating a configuration of WLAN-APs 11 and 12 in the third exemplary embodiment. Referring to FIG. 10, WLAN-APs 11 and 12 include control signal communicator 21, connection processor 22, and directing controller 23. Control signal communicator 21 and connection processor 22 operate as in the case of the first exemplary embodiment.

Directing controller 23 executes the processing for directing a WLAN terminal to a connection destination according to an instruction from policy control apparatus 13. The processing for directing includes processing for directing a WLAN terminal connected to its own apparatus to another WLAN-AP, and processing for directing a WLAN terminal connected to another WLAN-AP to its own apparatus.

One specific example of the processing for directing is a transmission power control. If WLAN-APs 11 and 12 decrease transmission electric power, WLAN terminals connected to the WLAN-AP can be directed to another WLAN-AP. On the contrary, if WLAN-APs 11 and 12 increase transmission electric power, WLAN terminals connected to another WLAN-AP to the WLAN-AP.

Another specific example of the processing for directing is a hand over operation led by a network. WLAN-APs 11 and 12 can direct a WLAN terminal connected to itself to another WLAN-AP by instructing the WLAN terminal to execute a hand over operation.

Another specific example of the processing for directing is an instruction for a reconnection. WLAN-APs 11 and 12 can direct a WLAN terminal connected to itself to another WLAN-AP by instructing the WLAN terminal to reconnect to another WLAN-AP. On the other hand, WLAN-APs 11 and 12 can direct a WLAN terminal connected to another WLAN-AP to its own apparatus by instructing the WLAN terminal to reconnect to its own apparatus.

In the third exemplary embodiment, load balancer 31 of policy control apparatus 13 executes the processing described below in addition to the processing illustrated in the first exemplary embodiment.

Load balancer 31 manages the load state of each WLAN-AP, and if there is a WLAN-AP which has reached in an overload state (Busy), instructs each WLAN-AP to direct a WLAN terminal from the WLAN-AP to another WLAN-AP.

Thus, when receiving a traffic report from a WLAN-AP through control signal communicator 32, if the WLAN-AP is in an overload state, load balancer 31 detects a nearby WLAN-AP whose coverage area is overlapping. Subsequently, load balancer 31 checks the load state of the nearby WLAN-AP to determine whether or not a WLAN terminal can be accepted. Specifically, it is determined whether or not the nearby WLAN-AP is in an over load state. If the nearby WLAN-AP is in a state to be able to accept a WLAN terminal, load balancer 31 instructs the WLAN-AP which is in an over load state to reduce the transmission electric power, and instructs the nearby WLAN-AP to increase the transmission electric power. Thereby, a WLAN terminal which executes a connection request after that can be directed to the nearby WLAN-AP.

Figure 11:
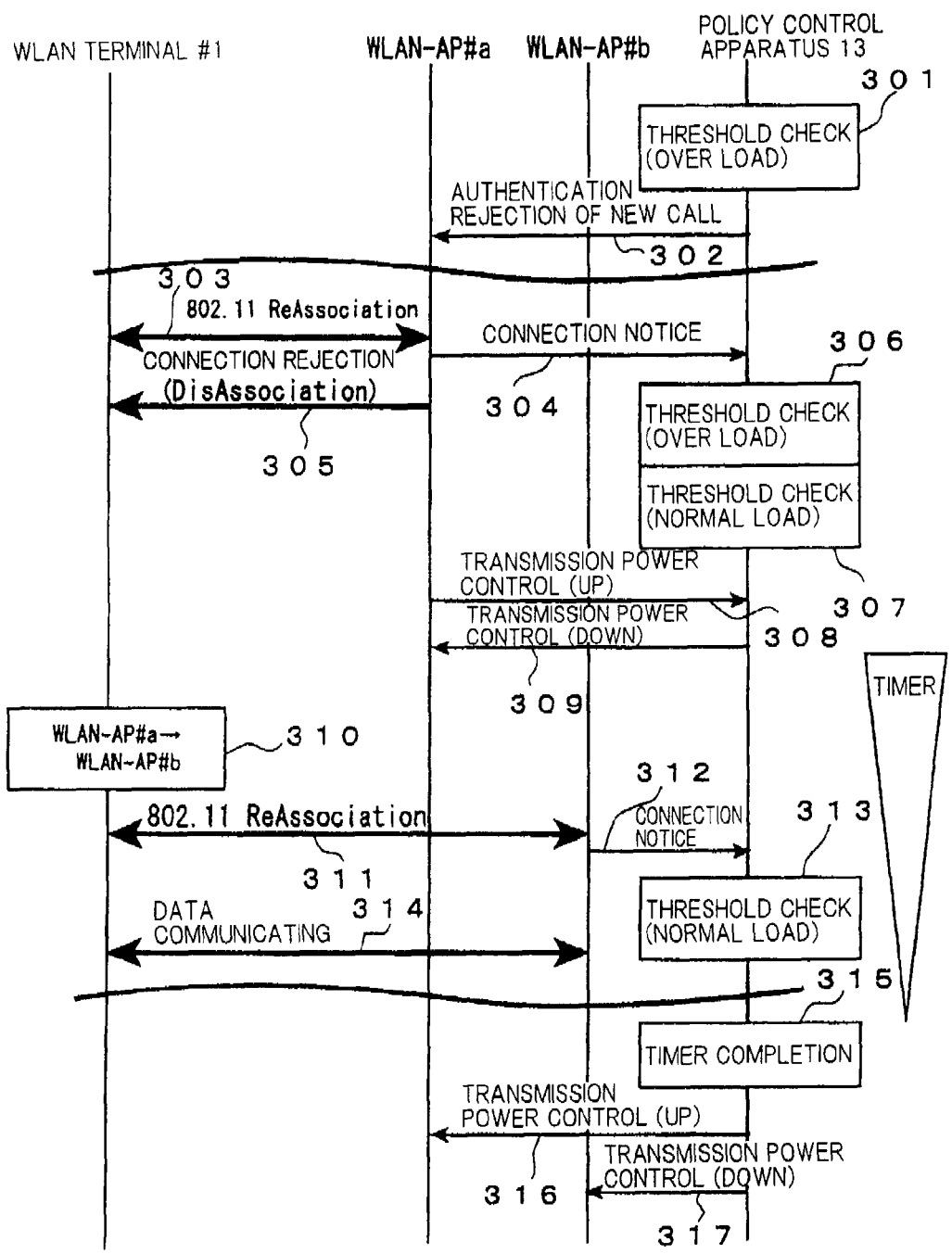
FIG. 11 is a sequence diagram illustrating an operation example of WLAN network system according to the third exemplary embodiment.

FIG. 11 is a sequence diagram illustrating an operation example of the WLAN network system according to the third exemplary embodiment. Here, WLAN-AP #a and WLAN-AP #b are connected under policy control apparatus 13. WLAN terminal #1 transmits a connection request to WLAN-AP #a.

Referring to FIG. 11, because the current connection number of WLAN-AP #a has reached the new connection threshold (step 301), policy control apparatus 13 transmits such a control instruction message to WLAN-AP #a so that it is caused to be in such a state that a new connection request is not permitted (step 302). WLAN-AP #a which has received the control instruction message moves to such a state in which a new connection request is not permitted.

At this state, WLAN terminal #1 transmits a connection request to WLAN-AP #a. It is assumed that this connection request is a new connection request. The "802.11 Association" procedure is executed between WLAN terminal #1 and WLAN-AP #a when the new connection request is issued (step 303).

At this point in time, WLAN-AP #a is in a state not to permit a new connection request. WLAN-AP # a transmits such a connection notice message to policy control apparatus 13 so that it does not connect a new call requested from WLAN terminal #1 (step 304).

WLAN-AP #a instructs WLAN terminal #1 to release a connection with the "802.11 DisAssociation" procedure (step 305). Because a new connection request is rejected, WLAN terminal #1 does not reach a state to be able to communicate data with WLAN-AP #a.

Policy control apparatus 13 which has received such a connection notice message that a new call is not connected compares the current connection number with the new connection threshold and the continuous connection threshold in WLAN-AP #a (step 306). At this time, because the current connection number has reached the new connection threshold, WLAN-AP #a is in an over load state.

Subsequently, policy control apparatus 13 compares the current connection number with the new connection threshold and the continuous connection threshold in WLAN-AP #b (step 307). At this time, it is assumed that the current connection number of WLAN-AP #b has not reached either of the new connection threshold or the continuous connection threshold (normal load state). Thus, policy control apparatus 13 makes a determination to direct a WLAN terminal from WLAN-AP #a to WLAN-AP #b.

Then, policy control apparatus 13 instructs WLAN-AP #b to increase the transmission electric power (step 308), and instructs WLAN-AP #a to decrease the transmission electric power (step 309). In the third exemplary embodiment, it is assumed that the transmission power control for directing a WLAN terminal is released after a certain time has passed. In order to measure the certain time, policy control apparatus 13 instructs WLAN-APs #a and #b to perform the transmission power control, and also, starts a timer which measures a certain time.

Here, it is assumed that the authentication-rejected WLAN terminal #1 has lost a wireless signal from WLAN-AP #a, and has detected a wireless signal from WLAN-AP #b (step 310). WLAN terminal #1 which has detected the wireless signal from WLAN-AP #b transmits a continuous connection request to WLAN-AP #b. The "802.11 ReAssociation" procedure is executed between WLAN terminal #1 and WLAN-AP #b when the continuous connection request is issued (step 311).

At this point in time, it is assumed that the current connection number of WLAN-AP #b has not reached the continuous connection threshold, and WLAN-AP #b is in a state to permit a continuous connection request. WLAN-AP #b permits a continuous connection request, and transmits a connection notice message to policy control apparatus 13 as a traffic report (step 313). This connection notice message notifies policy control apparatus 13 that WLAN terminal #1 has connected to WLAN-AP #b, and includes information indicating that a new call has been connected. WLAN terminal #1 reaches in a state in which it is able to communicate data with WLAN-AP #b because of the permission of the new connection request (step 314).

If the timer, which measures the time of the transmission power control, is expired (step 315), in order to stop directing calls of WLAN terminals, policy control apparatus 13 instructs WLAN-AP #a to decrease the transmission electric power (step 316), and instructs WLAN-AP #b to increase the transmission electric power (step 317).

As described above, according to the third exemplary embodiment, if each of WLAN-APs 11 and 12 connects to a WLAN terminal, the WLAN terminal transmits such a traffic report to policy control apparatus 13 that it has connected to the WLAN terminal. Policy control apparatus 13 manages the load state of each of WLAN-APs 11 and 12 based on a traffic report, and, if there is a WLAN-AP which has become overloaded, directs a WLAN terminal from the WLAN-AP to another WLAN-AP. Thereby, it is possible to distribute the load in the WLAN network, and to realize stability of traffic as a whole.

Meanwhile, in each exemplary embodiment described above, it is assumed that each load state is managed for each WLAN-AP, however, the present invention is not limited to such exemplary embodiments. If a wireless link within a WLAN-AP is logically divided, and virtual AP (virtual access point) or VLAN is defined, the load state may be managed for each virtual AP or each VLAN. Thereby, it is possible to further finely manage and control the load state.

While preferred embodiments of the present invention have been described using specific terms, such description is for illustrative purposes only, and it is to be understood that changes and variations may be made without departing from the spirit or scope of the following claims.

What is claimed is:

1. A wireless network system enabling communication between a terminal and a higher-level network by establishing a wireless connection with the terminal, said wireless network system comprising:
   a plurality of access points connected with the higher-level network, and that form wireless coverage areas, when connecting with the terminal within the coverage area, enable communication between the higher-level network and the terminal, and that transmit a connection notice which indicates that the terminal is requesting to establish a connection with a transmitting access point among the plurality of access points that transmits the connection notice, the connection notice indicating a quality of service (QoS) class of the connection; and
   a policy control apparatus connected with the plurality of access points that determines whether a total number of connections having the QoS class connected to the transmitting access point exceeds a threshold number of connections having the QoS class, and manages a load state of the transmitting access point based on a result of the determination,
   wherein the transmitting access point transmits the connection notice, that distinguishes a new call from an existing call, to the policy control apparatus, and
   wherein the policy control apparatus sets a first threshold for limiting connection of the new call and a second threshold for limiting connection of the existing call, determines the number of terminals connected to the transmitting access point based on the connection notice, instructs the transmitting access point to limit connection of the new call when the number of terminals reaches the first threshold, and instructs the transmitting access point to limit connection of the existing call when the number of terminals reaches the second threshold.

2. The wireless network system according to claim 1, wherein the first threshold is less than or equal to the second threshold.

3. A wireless network system enabling communication between a terminal and a higher-level network by establishing a wireless connection with the terminal, said wireless network system comprising:
   a plurality of access points connected with the higher-level network, and that form wireless coverage areas, when connecting with the terminal within the coverage area, enable communication between the higher-level network and the terminal, and that transmit a connection notice which indicates that the terminal is requesting to establish a connection with a transmitting access point among the plurality of access points that transmits the connection notice, the connection notice indicating a quality of service (QoS) class of the connection; and
   a policy control apparatus connected with the plurality of access points that determines whether a total number of connections having the QoS class connected to the transmitting access point exceeds a threshold number of connections having the QoS class, and manages a load state of the transmitting access point based on a result of the determination,
   wherein the policy control apparatus sets a weight of a call for each of a plurality of QoS classes, and manages an accumulated value of the load of each of the access points by accumulating the weight, based on the QoS indicated in the connection notice.

4. The wireless network system according to claim 3, wherein the policy control apparatus sets a plurality of thresholds for limiting connection of a call for each of the QoS classes, compares the accumulated value that is calculated based on the connection notice with the plurality of thresholds, and limits connection of a call for each of the QoS classes according to each comparison result.

5. A wireless network system enabling communication between a terminal and a higher-level network by establishing a wireless connection with the terminal, said wireless network system comprising:
   a plurality of access points connected with the higher-level network, and that form wireless coverage areas, when connecting with the terminal within the coverage area, enable communication between the higher-level network and the terminal, and that transmit a connection notice which indicates that the terminal is requesting to establish a connection with a transmitting access point among the plurality of access points that transmits the connection notice, the connection notice indicating a quality of service (QoS) class of the connection; and
   a policy control apparatus connected with the plurality of access points that determines whether a total number of connections having the QoS class connected to the transmitting access point exceeds a threshold number of connections having the QoS class, and managers a load state of the transmitting access point based on a result of the determination,
   wherein when rejecting a connection request from the terminal according to an instruction from the policy control apparatus, the transmitting access point transmits a notice of connection rejection to the policy control apparatus, and
   wherein when receiving the notice of connection rejection, if the transmitting access point is in an over load state, and if a nearby access point, whose coverage area overlaps with a coverage area of the transmitting access point, is not in an overload state, the policy control apparatus directs the terminal to the nearby access point that is not in an overload state.

6. The wireless network system according to claim 5, wherein the policy control apparatus directs the terminal of the transmitting access point in the overload state to the nearby access point that is not in the overload state by causing the transmitting access point in the overload state to decrease transmission electric power and by causing the nearby access point that is not in the overload state to increase the transmission electric power.

7. A policy control apparatus connected to an access point that forms a wireless local area network (LAN) that enables communication between a terminal and a higher-level network by establishing a wireless connection with the terminal, said policy control apparatus comprising:
a control signal communicator which connects to the access point, and transmits a control signal to the access point; and
a load balancer which receives a connection notice transmitted from the access point which indicates that the terminal is requesting to establish a connection with the access point, the connection notice indicating a quality of service (QoS) class of the connection, determines whether a total number of connections having the QoS class connected to the transmitting access point exceeds a threshold number of connections having the QoS class, and manages a load state of the access point based on a result of the determination,
wherein the access point transmits the connection notice which distinguishes a new call from an existing call to the policy control apparatus, and
wherein the load balancer of the policy control apparatus sets a first threshold for limiting a connection of the new call and a second threshold for limiting a connection of the existing call, determines the number of terminals connected to the access point based on the connection notice, instructs the access point to limit a connection of the new call when the number of terminals reaches the first threshold, and instructs the access point to limit a connection of the existing call when the number of terminals reaches the second threshold.

8. The policy control apparatus according to claim 7, wherein the first threshold is less than or equal to the second threshold.

9. A policy control apparatus connected to an access point that forms a wireless local area network (LAN) that enables communication between a terminal and a higher-level network by establishing a wireless connection with the terminal, said policy control apparatus comprising:
a control signal communicator which connects to the access point, and transmits a control signal to the access point; and
a load balancer which receives a connection notice transmitted from the access point which indicates that the terminal is requesting to establish a connection with the access point, the connection notice indicating a quality of service (QoS) class of the connection, determines whether a total number of connections having the QoS class connected to the transmitting access point exceeds a threshold number of connections having the QoS class, and manages a load state of the access point based on a result of the determination,
wherein the load balancer of the policy control apparatus sets a weight of a call for each of a plurality of QoS classes, and manages an accumulated value of the load of the access point by accumulating the weight, based on the QoS indicated in the connection notice.

10. The policy control apparatus according to claim 9, wherein the load balancer sets a plurality of thresholds for limiting a connection of a call for each of the QoS classes, compares the accumulated value calculated based on the connection notice with the plurality of thresholds, and limits a connection of a call for each of the QoS classes according to each comparison result.

11. A policy control apparatus connected to an access point that forms a wireless local area network (LAN) that enables communication between a terminal and a higher-level network by establishing a wireless connection with the terminal, said policy control apparatus comprising:
a control signal communicator which connects to the access point, and transmits a control signal to the access point; and
a load balancer which receives a connection notice transmitted from the access point which indicates that the terminal is requesting to establish a connection with the access point, the connection notice indicating a quality of service (QoS) class of the connection, determines whether a total number of connections having the QoS class connected to the transmitting access point exceeds a threshold number of connections having the QoS class, and managers a load state of the access point based on a result of the determination,
wherein when rejecting a connection request from the terminal according to an instruction from the policy control apparatus, the access point transmits a notice of connection rejection to the policy control apparatus, and
wherein when receiving the notice of connection rejection, if the access point is in an over load state, and if a nearby access point, whose coverage area overlaps with a coverage area of the access point, is not in an overload state, the load balancer of the policy control apparatus directs the terminal to the nearby access point that is not in an overload state.

12. The policy control apparatus according to claim 11, wherein the load balancer directs the terminal of the access point in the overload state to the nearby access point that is not in the overload state by causing the access point in the overload state to decrease transmission electric power and by causing the nearby access point that is not in the overload state to increase the transmission electric power.

13. A load control method for a wireless local area network (LAN) system including an access point enabling communication between a terminal and a higher-level network by establishing a wireless connection with the terminal and a policy control apparatus connected to the access point, comprising:
in response to establishing a wireless connection with the terminal within the coverage area, transmitting, by the access point, a connection notice which indicates that the terminal is requesting to establish a connection with the access point, the connection notice indicating a quality of service (QoS) class of the connection;
determining, by the policy control apparatus, whether a total number of connections having the QoS class connected to the access point exceeds a threshold number of connections having the QoS class, and managing a load state of the access point based on a result of the determination,
wherein the access point transmits the connection notice, that distinguishes a new call from an existing call, to the policy control apparatus, and
wherein the policy control apparatus sets a first threshold for limiting connection of the new call and a second threshold for limiting connection of the existing call determines the number of terminals connected to the access point based on the connection notice, instructs the access point to limit connection of the new call when the number of terminals reaches the first threshold, and instructs the access point to limit connection of the existing call when the number of terminals reaches the second threshold.

14. A load control method for a wireless local area network (LAN) system including an access point enabling communication between a terminal and a higher-level network by establishing a wireless connection with the terminal and a policy control apparatus connected to the access point, comprising:

in response to establishing a wireless connection with the terminal within the coverage area, transmitting, by the access point, a connection notice which indicates that the terminal is requesting to establish a connection with the access point, the connection notice indicating a quality of service (QoS) class of the connection;

determining, by the policy control apparatus, whether a total number of connections having the QoS class connected to the access point exceeds a threshold number of connections having the QoS class, and managing a load state of the access point based on a result of the determination, wherein the policy control apparatus sets a weight of a call for each of a plurality of QoS classes, and manages an accumulated value of the load of the access point by accumulating the weight, based on the QoS indicated in the connection notice.

15. A load control method for a wireless local area network (LAN) system including an access point enabling communication between a terminal and a higher-level network by establishing a wireless connection with the terminal and a policy control apparatus connected to the access point, comprising:

in response to establishing a wireless connection with the terminal within the coverage area, transmitting, by the access point, a connection notice which indicates that the terminal is requesting to establish a connection with the access point, the connection notice indicating a quality of service (QoS) class of the connection;

determining, by the policy control apparatus, whether a total number of connections having the QoS class connected to the access point exceeds a threshold number of connections having the QoS class, and managing a load state of the access point based on a result of the determination, wherein when rejecting a connection request from the terminal according to an instruction from the policy control apparatus, the access point transmits a notice of connection rejection to the policy control apparatus, and wherein when receiving the notice of connection rejection, if the access point is in an over load state, and if a nearby access point, whose coverage area overlaps with a coverage area of the access point, is not in an overload state, the policy control apparatus directs the terminal to the nearby access point that is not in an overload state.

* * * * *